March 29, 1955 W. F. HODGE 2,705,310
METAL SLEEVE BASE TERMINAL
Filed April 19, 1954 2 Sheets-Sheet 1
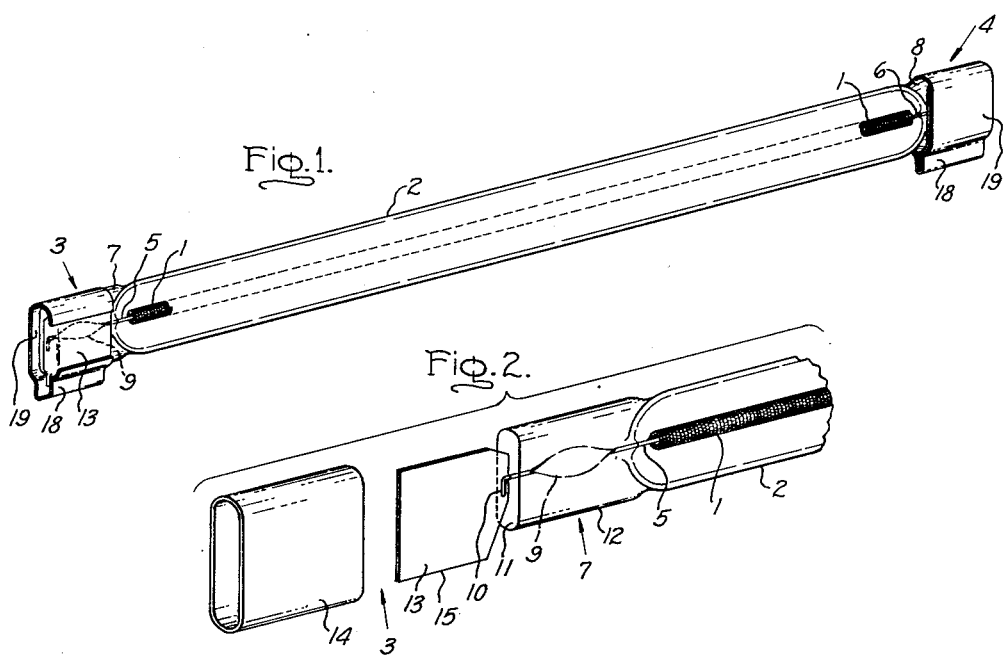
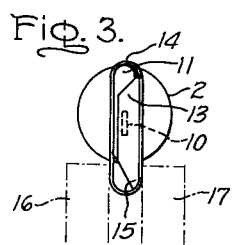
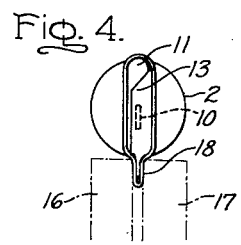
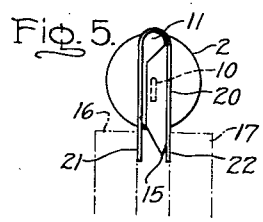
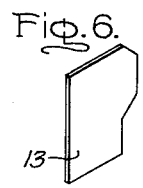
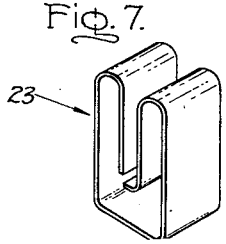
Inventor:
William F. Hodge,
by Vernet C. Kauffman
His Attorney.

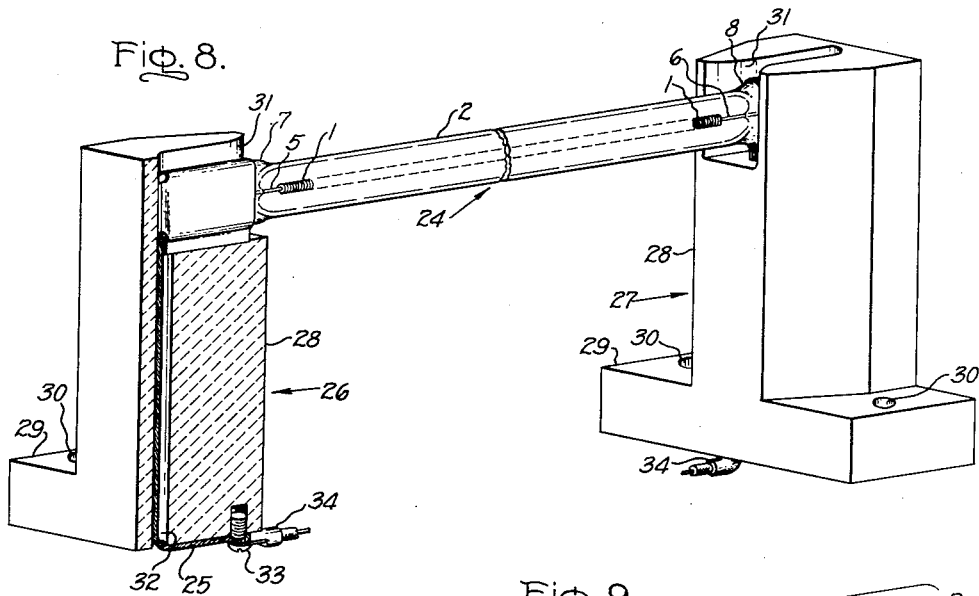
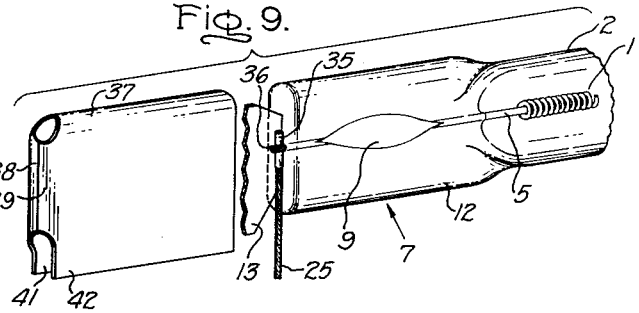
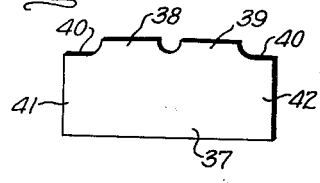
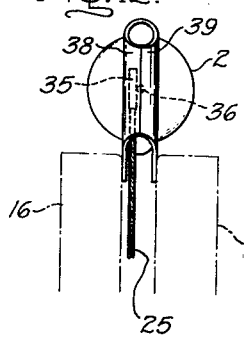
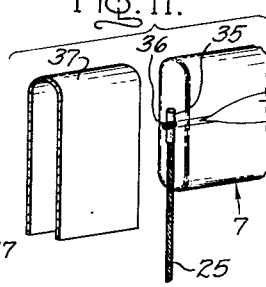
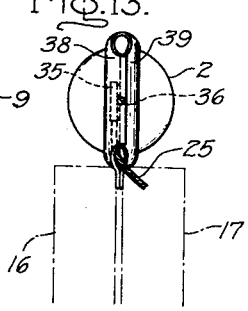

United States Patent Office 2,705,310
Patented Mar. 29, 1955

2,705,310

METAL SLEEVE BASE TERMINAL

William F. Hodge, Lyndhurst, Ohio, assignor to General Electric Company, a corporation of New York Application April 19, 1954, Serial No. 424,418

8 Claims. (Cl. 339—144)

The present invention relates to electrically conducting metal base terminals for electrical devices having elongated sealed double-ended envelopes of vitreous material provided with an externally extending flat pinched seal at each end.

The principal object of the invention is to provide metal base terminals readily mounted on the external flat seals of such vitreous envelopes, such as tubular quartz envelopes of electrical devices. Another object of the invention is to provide a method of mounting such base terminals on such devices. Further objects and advantages of the invention will appear from the following description of a species thereof and from the appended claims.

In the drawings accompanying and forming part of this specification species of the invention are shown in which:

Fig. 1 is a perspective, partly section view taken from the side and slightly above a double-ended electrical device useful as a heater and provided with metal bases of this invention.

Fig. 2 is an exploded perspective view on an enlarged scale of one end of the device shown in Fig. 1 partly assembled and showing the components of one of the bases.

Fig. 3 is an end view of the device shown in Figs. 1 and 2 and showing the base completely assembled and ready for fastening thereon and a pair of jaws, indicated in broken lines, of a vise useful for fastening the base.

Fig. 4 is a similar view of the device and the jaws showing the base clamped on the device by the jaws.

Fig. 5 is a similar view showing a modification of the assembled base.

Fig. 6 is a perspective view of a form of tab member useful in the base of Figs. 1 to 4.

Fig. 7 is a similar view of a spring metal support clip for receiving and making electrical contact with the bases of Figs. 1 to 5.

Fig. 8 is a perspective view of a double-ended electrical device provided with a species of base also embodying the invention and a pair of holders for the device.

Fig. 9 is an exploded perspective view on an enlarged scale of one end of the device shown in Fig. 8, partly assembled and showing the components of one of the bases of the device shown in Fig. 8.

Fig. 10 is a plan view of a thin metal strip forming the sleeve member shown in Figs. 8 and 9.

Fig. 11 is an exploded perspective view of a modification of the embodiment of Figs. 8, 9 and 10.

Fig. 12 is an end view of the device shown in Fig. 11 and a pair of jaws, indicated in broken lines, of a vise useful for fastening the sleeve on the flat seal of the device, and Fig. 13 is a similar view of the device and the jaws, showing the sleeve clamped on the flat seal device by the jaws.

Referring to Fig. 1 of the drawings, in which like numbers denote like parts in all the figures, the electrical heater comprises a coiled tungsten filament 1 emissive of infrared radiation and extending longitudinally within an elongated tubular sealed envelope 2 of transparent quartz.

The filament 1 is supplied with electrical energy through the metal base terminals 3 and 4 mounted on the ends of the envelope 2 and through the inleads 5 and 6 connecting the ends of the filament to the said bases.

The inleads 5 and 6 extend through the ends of the envelope 2 which are pinched flat and onto the inleads to form the flat pinch seals 7 and 8 on the envelope during manufacture of the heater.

The inleads 5 and 6 are of molybdenum wire and have a flattened portion, shown at 9 the left of Fig. 1 and in Fig. 2, which is embedded in and hermetically united with the quartz.

Since both bases 3 and 4 and both seals 7 and 8 are identical, the internal structure of only the base 3 and the seal 7 has been shown in the drawing. It will be understood, of course, that the following detailed description of the internal parts illustrated applies to both bases and both seals.

As shown in Fig. 2 the outer end portion 10 of the inlead 5 is bent over so as to lie against the outer end 11 of the pinch seal 7. The said end portion 10 constitutes an electric terminal of the envelope 2 and extends toward a rounded side edge 12 of the seal 7 but terminates short of the said edge 12.

The base 3 comprises a metal contact tab 13 permanently attached, as by being welded, to the envelope terminal 10. The tab 13 is bent so as to lie against one of the flat sides of the pinch seal 7 as shown in Fig. 1.

The base 3 also comprises an open-ended metal sleeve 14 formed from a seamless tube flattened to conform generally in shape to the shape of the seal 7. The sleeve 14 is of sufficient size to slip over the seal and the bent tab 13 in assembling the base 3 on the seal 7.

In assembling the base 3 on the pinch seal 7 of the envelope 2 the metal contact tab 13 is first positioned as shown in Fig. 2 and then welded to the bent over outer end 10 of the inlead 5. The tab 13, which is suitably of sheet nickel of foil-like thickness, that is, about 0.002 of an inch thick, is then folded back over the seal 7 until it lies against a flat side of the seal as shown at the left of Fig. 1. The tab is generally square except that the corners at the side welded to the outer end of the inlead are cut off (shown in Fig. 2) to facilitate folding the tab. The tab 13 is so dimensioned with respect to the pinch seal 7 that an edge 15 thereof extends beyond the side edge 12 of the seal as shown in Fig. 3.

The sleeve 14 is then slipped over the seal 7 and the tab 13. The base assembly is then clamped to the seal 7 by first placing between the open jaws 16 and 17 of a vise (Fig. 3) the longitudinal edge portion of the sleeve 14 opposite the edge portion 15 of the tab 13 extending beyond the side edge 12 of the seal 7, and then moving the jaws 16 and 17 toward each other to the position shown in Fig. 4.

In this manner the edge portion 15 of the tab 13 is clamped between the longitudinally extending pressed edge portion 18 of the sleeve 14 to make a firm physical and electrical contact therewith. Also, the sides and the other edge of the sleeve 14 are pulled down onto the seal 7 and the body portion of the tab 13 lying against the flat side of the seal to hold the base 3 firmly on the envelope 2. When this step is properly done the sleeve 14, which is preferably made from nickel tubing about 0.005 of an inch in wall thickness, is slightly stretched.

Preferably, several spot welds are made along the longitudinally extending pinched portion 18 (Figs. 1 and 4) of the sleeve 14 to assure good electrical contact between the tab 13 and the sleeve and to prevent loosening of the seal receiving and gripping portion 19 (Fig. 1) of the sleeve 14 on the press 7 under service conditions of the heater device. This is not essential, however. The pinched portion 18 of the sleeve may be folded over against the seal receiving portion 19, when desired, to reduce the size of the base.

The sleeve 14 may be formed from a folded metal strip rather than from a seamless tube. Such a sleeve, prior to being clamped around the seal 7 and the tab 13 by the jaws 16 and 17 as described above, is shown positioned on the seal at 20 in Fig. 5 of the drawing. When the sleeve 14 is made from such a strip it is necessary to weld or otherwise hold together the tab 13 and the edge parts 21 and 22 of the strip 20 constituting the longitudinally extending pressed edge portion 18 of the sleeve 14. The jaws 16 and 17 may, of course, be arranged to weld these parts together after forming portion 18 as described above in connection with Figs. 1 to 4, and without removing the sleeve from between the jaws.

Generally, the shape of quartz pinch seals is sufficiently irregular to prevent longitudinal slippage of the sleeve 14. Of course, the pinch seal may be shaped so as to assure retention of the base thereon; for example, its longitudinal edges may taper toward each other inwardly, but generally this is not necessary.

The shape of the tab 13 may be changed as desired, for example, as shown in Fig. 6.

The heater device illustrated in Fig. 1 may be supported by and supplied with electrical energy through a pair of spring clip support members into which the bases 3 and 4 may be inserted for frictional engagement. A suitable form of clip 23 is shown in Fig. 7 of the drawing.

The heater device 24 illustrated in Figs. 8 and 9 is similar to that shown in Figs. 1 to 5 and is provided with an elongated, flexible, stranded metal wire current lead 25 at each end to adapt the device for use with holders of the type shown at 26 and 27 in Fig. 8.

Each of the holders 26 and 27 of Fig. 8 are of the same structure and consists of refractory electrically insulating material. Each holder is made up of an elongated post 28 secured to and upstanding from a rectangular base part 29, the latter having passages 30 for accommodating bolts to secure the holder to a support, such as a supporting panel. A slot 31 is provided at the top of each post 28 to accommodate a flat seal end of the device 24 and a current lead accommodating passage 32 extends longitudinally through the post 28 from the slot 31 and opens at the bottom of the holder. A threaded terminal post 33 is provided at the bottom of each holder to which a power lead 34 and the flexible lead 25 of the device 24 may be attached and thus connected to each other.

The flexible lead 25 at each of the identical ends of the device of Fig. 8, one end of which is shown in Fig. 9, is of sufficient length to extend through the lead wire passage 32 in the holders 26 and 27 and engage the terminal post 33.

As shown in Fig. 9, the flexible lead 25 is provided with a cylindrical metal sleeve 35 at its inner end which is welded to the short, straight, exposed outer end 36 of the inlead 5. The current lead 25 extends generally transversely of the longitudinal axis of the heating device 24. The contact tab 13 in this embodiment is welded to the cylindrical sleeve 35, and as in the embodiment of Figs. 1 to 5, is bent over the sleeve 35 and the end 36 of the inlead 5, so as to lie against one of the flat sides of the pinch seal 7.

The metal sleeve around the flat seal 7 in this embodiment of the invention is similar to that shown in Fig. 5, in that it is formed from a thin folded metal strip 37. It differs from that shown in Fig. 5, however, in that two spaced tabs 38 and 39 (Fig. 10) are provided along one longitudinal edge 40 thereof. When the strip 37 is folded, as shown in Fig. 9, so as to be slipped over the pinch seal 7 and the part of the bent contact tab 13 against a flat side of the seal, the tabs 38 and 39 are opposite each other. The tabs 38 and 39 are folded inwardly of the folded strip 37 before the latter is placed on the seal 7, as shown in Fig. 9.

The strip 37 shown in Fig. 10, after being folded as shown in Fig. 9, is clamped around the pinch seal 7 by the clamping jaws 16 and 17 (Figs. 12 and 13) as described in connection with Fig. 5 and the pressed together end parts 41 and 42 of the strip are welded together to retain the strip on the seal with the part of the thin strip around the seal stretched slightly to firmly grip the seal and firmly engage the tab 13. The tab 13 makes a large area contact with the sleeve and conducts heat from the end 35 of the inlead 5 to the sleeve and thus tends to lower the temperature of the end portion of the inlead 5 during operation of the device. This is advantageous in such high temperature heating devices for protection of the inner portions of the seal against destructive temperatures.

After the strip 37 has been so attached to the device 24, the tabs 38 and 39 are forced inwardly against the end of the seal so as to overlap each other, as shown in Fig. 13, thus closing the outer end of the sleeve and protectively covering the joined parts 35, 36 and 13. The tabs 38 and 39 are so shaped that, when so folded and forced inwardly, their end edges grip the flexible lead wire 25 as shown in Fig. 13 and thus provide support against forces tending to twist and break the welded joint between the cylindrical sleeve 35 of the lead 25 and the end 36 of the lamp inlead 5.

When the heating device is to be used solely with holders of the type illustrated in Fig. 8, that is, when the flexible current leads 25 only are to be utilized to conduct electrical energy to the inleads 5 attached to the filament 1 of the heating device 24, the contact tabs 13 may be omitted as shown in Figs. 11 to 13. The strip sleeve 37 shown in Figs. 11 to 13 is retained, however, as part of the terminal structure of the heater device for protection of the parts of the device enclosed thereby and for the support it provides for the flexible lead 25 against forces tending to move the cylindrical end 35 of the flexible lead 25 with respect to the end 36 of the stiff inlead 5 to which it is welded.

From the foregoing description of species of the invention, it is apparent that the invention in its broad aspect contemplates a terminal structure for an electrical device having a vitreous envelope provided with a flat pinch seal and an electrical conductor, such as the inlead 5, having an exposed end and extending through the seal into the envelope, wherein the terminal structure includes the exposed inlead end, a thin-walled metal sleeve clamped and stretched around the seal to hold the sleeve firmly thereon, and a conducting member, which may be in the form of the contact tab 13 or the flexible inlead 25, or both, which is attached to the exposed end of the inlead so as to conduct electrical energy thereto and which is gripped by the sleeve so as to be supported thereby at least in part.

While I have shown and described the terminal structure of my invention as applied to the pinch seal of an envelope of a heater device, it will be understood, of course, that I contemplate its use with other devices having envelopes provided with similar seals, such as the envelopes of gaseous electric discharge quartz lamps having electrodes at the ends thereof.

This application is a continuation-in-part of my co-pending application, Serial No. 347,590, filed Apr. 8, 1953, now abandoned, and assigned to the assignee of the present application.

What I claim as new and desire to secure by Letters Patent of the United States is:

1. A metal base terminal for a vitreous envelope having a flat pinch seal provided with an electric terminal exposed at its end, said base terminal comprising a metal sleeve having a seal receiving and gripping portion and a collapsed edge portion, and a metal tab within said sleeve with an edge thereof clamped between the walls of the collapsed edge portion of said sleeve, the outer edge of said tab extending transversely inward of said sleeve and constituting the envelope terminal engaging portion of said base.

2. A metal base terminal for a vitreous envelope having a flat pinch seal provided with an electric terminal exposed it its end, said base terminal comprising a metal sleeve having a seal receiving and gripping portion and a collapsed edge portion, and a metal tab within said sleeve with an edge thereof clamped between the walls of the collapsed edge portion of said sleeve and a body portion extending into the seal receiving sleeve portion, the outer edge of said tab extending transversely inward of said sleeve and constituting the envelope terminal engaging portion of said base.

3. In combination, an electric device having a double-ended vitreous envelope provided with a flat pinch seal and an exposed electric terminal at each of its ends and base terminals for said device at the ends of said envelope and engaging said pinch seals and said envelope terminals, each of said base terminals comprising a metal sleeve having a portion thereof clamped around a pinch seal to hold said base on said envelope and a collapsed longitudinal edge portion and comprising also a thin metal tab within said sleeve with an edge thereof clamped between the walls of the collapsed edge portion of said sleeve and its body portion clamped between said seal and said sleeve, the outer edge of said tab extending transversely inward of said sleeve and into engagement with said exposed envelope terminal.

4. In combination, an electric device having a double-ended vitreous envelope provided with a flat pinch seal and an exposed electric terminal at each of its ends and base terminals at the ends of said envelope and engaging said pinch seals and said envelope terminals, each of said base terminals comprising a metal sleeve having a portion thereof clamped and stretched around a pinch seal to hold said base terminal on said envelope and a collapsed longitudinal edge portion and comprising also a thin metal tab within said sleeve with an edge thereof clamped between the walls of the collapsed edge portion of said sleeve and its body portion clamped between said seal and said sleeve, the outer edge of said tab extending transversely inward of said sleeve and into engagement with said exposed envelope terminal.

5. The method of mounting a metal base terminal on a vitreous flat pinch seal having an exposed electric terminal at its end which comprises the steps of affixing an edge of a thin sheet metal tab to said seal terminal, folding said tab over the end of said seal and into engagement with one of its flat sides with an edge portion of said tab projecting beyond a longitudinal edge of said seal, mounting a metal sleeve on said seal and said tab, and then pressing together the sleeve opposite the projecting edge portion of said tab to clamp said sleeve around said seal and the said edge of said tab between the pressed together portion of the sleeve.

6. In combination, an electrical device having a double-ended vitreous envelope provided with a flat pinch seal and a terminal structure at each of its ends, said terminal structure including an exposed end of a current inlead extending through said seal, a thin-walled metal sleeve having a portion thereof clamped and stretched around said seal to hold said sleeve firmly on said seal and a conducting member attached to the exposed end of said inlead and extending into engagement with said sleeve, said sleeve exerting a clamping action on said member and thereby providing support for said member on said device.

7. In combination, an electrical device having a double-ended vitreous envelope provided with a flat pinch seal and a terminal structure at each of its ends, said terminal structure including as exposed end of a current inlead extending through said seal, a thin-walled metal sleeve having a portion thereof clamped and stretched around said seal to hold said sleeve firmly on said seal, the outer end of said sleeve having opposed integral tabs folded over into overlapping positions to close the said end of said sleeve and cover the exposed end of said inlead, said terminal structure comprising also a flexible current lead attached to the exposed end of said inlead and extending through the outer end of said sleeve, the overlapping tabs on said sleeve engaging and exerting a clamping action on said flexible lead whereby said sleeve provides support for said flexible lead on said device.

8. In combination, an electrical device having a double-ended vitreous envelope provided with a flat pinch seal and a terminal structure at each of its ends, said terminal structure including an exposed end of a current inlead extending through said seal, a thin-walled metal sleeve having a portion thereof clamped and stretched around said seal to hold said sleeve firmly on said seal, the outer end of said sleeve having opposed integral tabs folded over into overlapping positions to close the said end of said sleeve and protectively cover the exposed end of said inlead, said terminal structure comprising also a flexible current lead and a thin metal contact tab, said lead and said contact tab being attached to the exposed end of said inlead, said contact tab being within said sleeve and clamped between said seal and said sleeve, said flexible lead extending through the outer end of said sleeve, the overlapping integral tabs on said sleeve engaging and exerting a clamping action on said flexible lead whereby said sleeve provides support for said flexible lead and said contact tab on said device.

No references cited.